Figure 4:
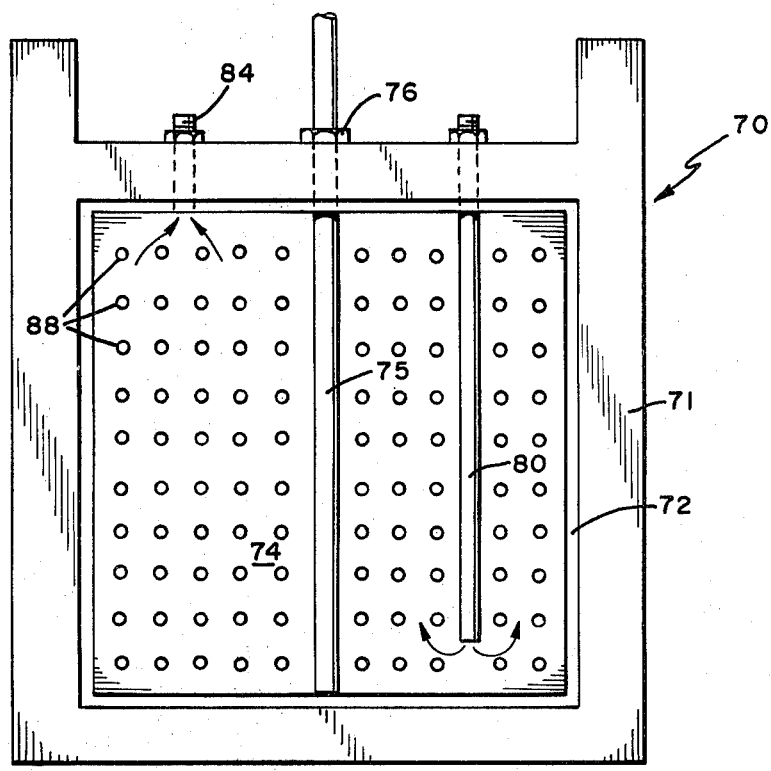

United States Patent [19]

Eichler et al.

[11] 4,303,492

[45] Dec. 1, 1981

[54] ELECTRODE ASSEMBLY

[75] Inventors: Jack H. Eichler, Westport; Mark P. Freeman, Darien; William A. Salancy, Norwalk, all of Conn.

[73] Assignee: Dorr-Oliver Incorporated, Stamford, Conn.

[21] Appl. No.: 109,931

[22] Filed: Jan. 4, 1980

[51] Int. Cl.³ .................................................. C25D 17/10
[52] U.S. Cl. .................................... 204/300 R; 204/286
[58] Field of Search ............................. 204/300 R, 286

[56] References Cited

U.S. PATENT DOCUMENTS 4,168,222  9/1979  Freeman .......................... 204/300 R Primary Examiner—F. Edmundson
Attorney, Agent, or Firm—Burtsell J. Kearns; Harold M. Snyder

[57] ABSTRACT

An electrode assembly for use in dewatering a suspension of solids in which an electric field augments an applied vacuum includes a chamber having ion-pervious walls on which a cake of solids is deposited and an electrode element within the chamber immersed in an electrolyte; the surface area of the ion-pervious walls being substantially greater than the surface area of the electrode element.

10 Claims, 5 Drawing Figures

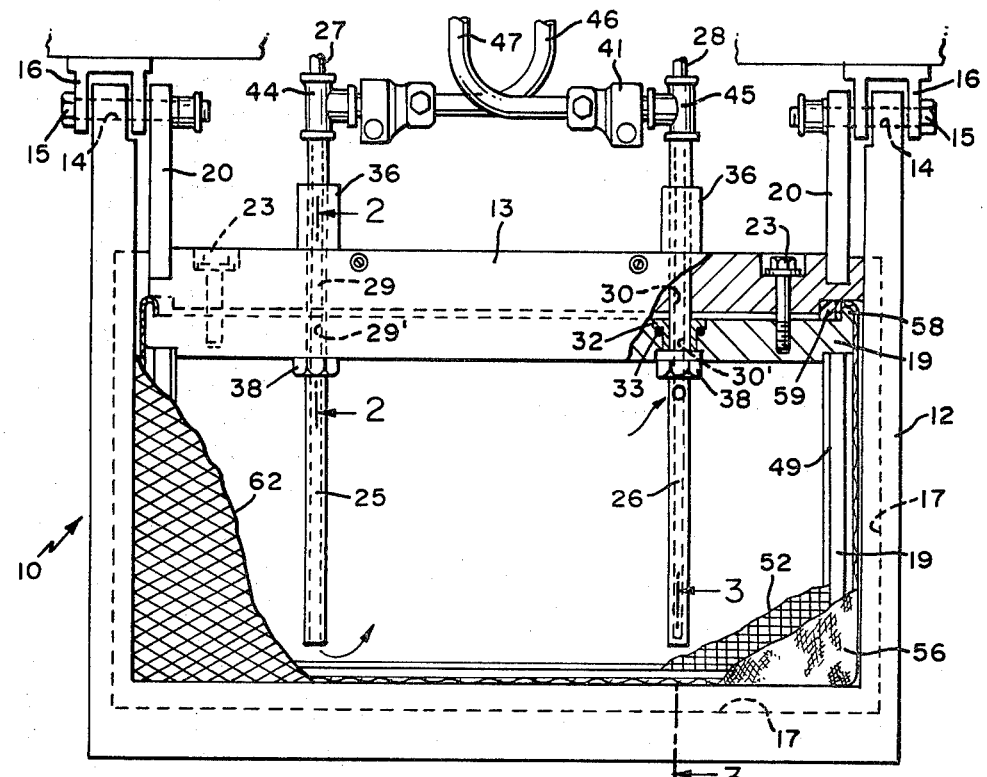
FIG. 1
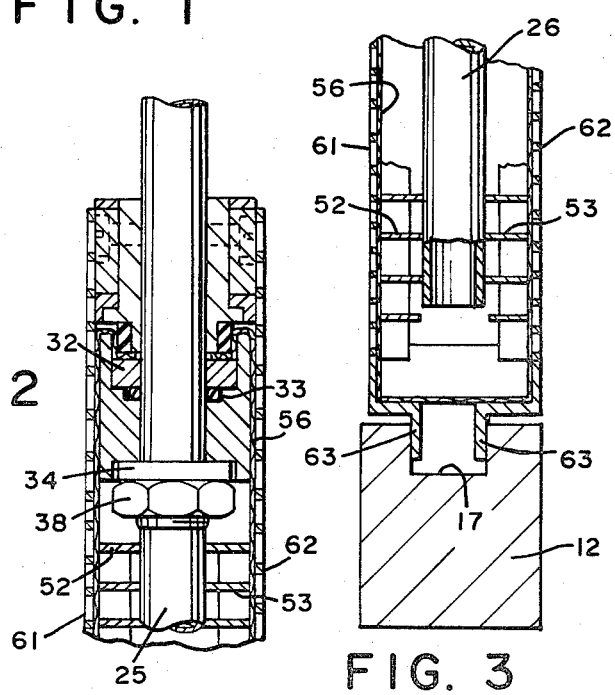
FIG. 2
FIG. 3

ELECTRODE ASSEMBLY

This invention is directed to an improved electrode assembly for use in dewatering suspensions of finely divided or colloidal solids in a carrier liquid, for example, a kaolin suspension in water, by application of vacuum, with the vacuum dewatering process augmented by an electric field created by passing an electric current through the suspension by means of a pair of spaced electrodes submerged in the suspension.

Process and apparatus for carrying out dewatering of suspensions is disclosed in U.S. Pat. No. 4,168,222, issued Sept. 18, 1979, and in copending application Ser. No. 40,351, filed May 18, 1979, which matured to U.S. Pat. No. 4,207,158 on June 10, 1980. In these earlier disclosures, self-contained hollow electrode assemblies are provided which are normally submerged in the suspension, but bodily removable therefrom for inspection or other purposes. These hollow electrodes comprise two types of wall surfaces: ion-previous walls for electrode assembles of one polarity and liquid-pervious walls for electrode assemblies of the opposite polarity. The wall surfaces of the electrode assemblies comprise chemically and electrically neutral filter media or permeable porous membrane backed by a supporting grid, thus presenting a planar electrode surface.

In operation, with electrode assemblies of both types immersed in the suspension, a source of vacuum is connected to the interior of the electrode assemblies having liquid-pervious walls to provide a controllable pressure differential thereby producing a flow of carrier liquid through the filtration surfaces, while the solids migrate in the opposite direction, under the influence of the electric field, to deposit as cake upon the electrode assemblies having ion-pervious walls. Filtrate liquid, that is, carrier liquid freed of solids, is withdrawn or pumped from the interior of the liquid-filled hollow electrode structure at a controllable rate.

As indicated, cake deposition occurs on the hollow electrode assemblies having ion-pervious surfaces; these electrode assemblies being filled with an electrolyte and having an electrode element therein immersed in the electrolyte, isolated from direct contact with the suspension. The electrolyte is specially selected for high conductivity and compatibility with the electrode element. By compatibility is meant the relatively non-corrosive character of the electrolyte under the conditions that ordinarily prevail within the hollow electrode assembly. Since decomposition or evolution products are generated at the electrode element within the hollow ion-pervious electrode assembly, provision is made for a flow of electrolyte into and through the electrode chamber so that such foreign products are swept out of the chamber and a relatively constant predetermined electrolyte composition is maintained.

The ion-pervious wall of the electrode assembly in these prior art structures comprises a chemically and electrically neutral filter media or permeable porous membrane which, if film-like in nature or otherwise requiring support, may be backed by a chemically and electrically neutral grid so that a planar electrode filter surface is presented to the slurry being treated. Since the cake will form on the counter electrode during electrofiltration and must be removed by contact with doctoring blades, a friction cage may be provided to protect the filter medium from direct contact with the doctoring blades. The friction cage comprises a thin, open screen-work of relatively hard material for contact with the doctoring blades. For the purpose of cake recovery, the electrode assembly may be raised to a position of emergence from the suspension, with the layer of collected solids or cake layer adhering thereto. Since the electrolyte remains within the electrode assembly in the raised position, a vacuum is applied internally of the electrode to reduce the pressure on the filter media and so prevent loss of electrolyte and/or rupture of the filter media. When the electrode assembly is immersed in operation, the vacuum applied internally serves to remove gaseous products, such as chlorine, evolved at the electrode element.

In the prior art disclosures, the area of the electrode element is essentially co-extensive with the area of the filter media, an arrangement intended to obtain a uniform cake deposit on the filter media. Since the electrode elements have a limited life in the electrofiltration environment and may be made of relatively expensive materials, such as titanium, which require costly fabrication processing to obtain large surface areas, there is a clear need for less expensive but durable electrode elements to establish the necessary electric field.

Accordingly, it is an object of this invention to provide an improved electrode assembly for carrying out an electrofiltration process.

Figure 5:
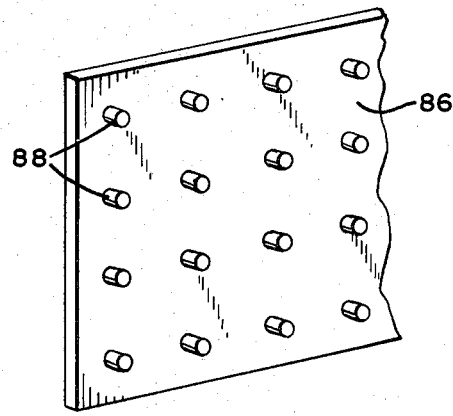

Other objects and advantages of the present invention will become apparent from the following description taken in conjunction with the accompanying drawings, in which:

FIG. 1 is a view of the electrode assembly in part in section and in part broken away, FIG. 2 is an enlarged detail view taken along line 2—2 of FIG. 1, FIG. 3 is an enlarged detail view taken along line 3—3 of FIG. 1, FIG. 4 is a view of a modified embodiment of the electrode assembly, and FIG. 5 is a perspective view of the filter member for the electrode assembly of FIG. 4.

Generally speaking, the anode assembly of the invention for immersion in a suspension of solids comprises a chamber having at least one ion-pervious wall with at least one electrode element therein immersed in an electrolyte, the electrolyte having a high conductivity, say 60,000 $\mu$MHO/cm or higher, the ratio of the total area of said ion-pervious wall to the total area of said electrode element or elements being from 2:1 to 350:1.

In the following description, the electrode assembly will be termed an anode assembly for convenience, although it will be understood that the unit may be cathodic for certain dewatering operations.

Referring to the drawings, there is illustrated an anode assembly 10 comprising a non-conductive U-shaped frame 12 provided with mounting holes 14 therein which cooperate with similar holes in hangers 16 and with bolts 15 for suspending frame 12 from an overhead support (not illustrated in detail). An internal frame 19 fits within U-shaped frame 12 and is secured in place by the pressure plate 13. The pressure plate 13 has support ears 20 with mounting holes therein for mounting on bolts 15. Pressure plate bolts 23 secure the internal frame 19 to the pressure plate 13. Inlet tube 25 passes through the pressure plate 13 and the internal frame 19 through the aligned bores 29 and 29', respectively. In the same way, outlet tube 26 passes through the pressure plate 13 and the internal frame 19 through the aligned bores 30 and 30', respectively. Tubes 25 and 26 meet and join with T-joints 44 and 45, respectively. The T-joints are provided to accommodate electrical connectors 40 and 41, respectively, for connecting the T-joints and the connecting tubes 25 and 26 to the electrical conduits 46 and 47 which are of the same polarity. Inlet and outlet tubes 25 and 26 connect through T-joints 44 and 45 with supply tube 27 and withdrawal tube 28, respectively. Tubes 25 and 26 are secured in place by the threaded nuts 38.

The surfaces on which the cake is deposited are formed of several cooperating elements. The innermost of these elements are the non-conducting grids 52 and 53 which provide support for the relatively fragile ion-pervious membrane 56. The membrane 56 essentially surrounds the anode compartment and has a bag-like configuration with the open top thereof secured over the retaining rim 58 on the internal frame 19 between the seal 59 and the pressure plate 13. External of the membrane 56 are a pair of perforated friction cages 62 and 62' which protect the membrane during the doctoring operation for removal of the deposited cake. The cages 62 and 62' have projecting flanges 63 which extend into grooves 17 in the U-shaped frame 12 along the sides and bottom thereof to properly position the cages.

In the embodiment shown in FIGS. 1 to 3, the inlet and outlet tubes 25 and 26 are arranged to provide both the flow of electrolyte through the anode assembly and electric current flow for the anode assembly through the conductors 46 and 47. It will be seen that fresh electrolyte is introduced into the anode chamber through inlet tube 25 while electrolyte is exhausted from the chamber through the outlet tube 26. The flow of electrolyte through the electrode elements tends to keep them cool.

In the modified embodiment of the invention shown in FIGS. 4 and 5, a non-conductive frame member 70, which may be made of plastic, defines a rectangular chamber region 74. On each side of the frame 70, bordering the chamber 74, is a rabbet joint 72. Within the chamber 74 there are provided an inlet tube 80, an outlet tube 84 and an anode element 75. Electrolyte is freely circulated through chamber 74 with fresh electrolyte introduced through inlet tube 80 and resident electrolyte exhausted through the outlet tube 84. The anode element 75 may be of a simple rod-shaped configuration. The ion-pervious member may, in this case, be a relatively rigid member 86 of porous plastic or porous ceramic which fits against frame 70 in the rabbet joint 72. The porous plastic or ceramic member 86 may have a thickness of from 0.25 to 0.75 inch, for example, and may be provided with a plurality of spacing and support members 88 which support the members against buckling under the vacuum existing in the anode chamber. In this case, the electrolyte flow and current flow are handled by separate elements. A material sold under the name "Structural Ceramic" is suitable for use as the ion-pervious member (a product of the 3-M Company) and a plastic material sold by the Glassrock Company under the name "Porex" may be similarly applied. Both materials are available in a range of porosities.

An electrode assembly having a plastic frame has a flat porous membrane surface providing a total area (two sides) for cake deposition of 0.69 ft.$^2$ and is provided with a single electrode element within the electrode chamber consisting of a ¼" diameter titanium rod coated with ruthenium oxide. The electrode chamber is filled with a 1 N sodium chloride electrolyte having a conductivity of 76,000 μMHO/cm. The electrode assembly is immersed in a 36% solids kaolin slurry. The electrode assembly is operated as an anode assembly cooperating with a cathode member immersed in the slurry at a constant voltage. Several runs are made with insulating tape masking areas of the anode element to determine the effect on cake deposition of increasing the ratio of porous membrane area to the anode element area. The results may be summarized as follows:

| Run | Volts | Amps | Temp. | Time | Membrane Area/Anode Area |
|---|---|---|---|---|---|
| 1 | 50 | 5 | 20 C. | 5 Min. | 18:1 |
| 2 | 50 | 5 | 20 C. | 5 Min. | 255:1 |
| 3 | 50 | 5 | 20 C. | 5 Min. | 343:1 |
| 4 | 50 | 5 | 20 C. | 5 Min. | 497:1 |

In all of the above runs the amount of cake deposited falls in the range from 240 to 260 grams. The cake is in all cases evenly distributed over the flat surface of the membrane, with no evidence of any "shadow" of the electrode observable on the cake. Accordingly, where the electrolyte has high conductivity, the electrode element may have a simple shape and a relatively small area.

However, it was noted that at the highest current density (Run 4), the surface of the electrode was being rapidly eroded or consumed. In the runs at lower current density, there was no observable damage to the electrode.

Although the present invention has been described in conjunction with preferred embodiments, it is to be understood that modification and variation may be resorted to without departing from the spirit and scope of the invention as those skilled in the art will readily understand.

We claim:

1. An electrode assembly for electrically augmented vacuum filtration of a suspension of solids in a carrier liquid, which comprises,
    an external non-conductive frame member,
    an internal non-conductive frame member slidably fitting within said external frame member and thereby defining top, bottom and two side walls of an electrode chamber,
    ion-pervious filter elements forming the remaining two side walls of an electrode chamber so that said electrode assembly can be immersed in said suspension of solids,
    at least one electrode element within said electrode chamber electrically connected to a voltage source external of said electrode chamber and immersed in an electrolyte having a high conductivity,
    the ratio of the total area of said ion-pervious filter elements immersed in said suspension of solids to the total area of said electrode element immersed in said electrolyte being at least 2:1 and no more than 350:1.

2. The electrode assembly of claim 1 wherein means are provided for establishing a flow of electrolyte through said electrode chamber.

3. The electrode assembly of claim 2 wherein the electrode elements are rod-shaped.

4. The electrode assembly of claim 2 wherein at least one electrode element is tubular to permit introduction of electrolyte therethrough, said ion-pervious filter elements are relatively rigid porous plastic members and the electrolyte is a solution of sodium chloride.

5. The electrode assembly of claim 2 wherein said electrode elements are tubular to permit introduction and removal of electrolyte therethrough, said ion-pervious filter elements are relatively rigid porous plastic members and the electrolyte has a conductivity of 60,000 MHO/cm.

6. The electrode assembly of claim 2 wherein the ion-pervious filter elements are relatively rigid porous plastic members.

7. The electrode assembly of claim 2 wherein said ion-pervious filter elements are relatively rigid porous ceramic members.

8. The electrode assembly of claim 2 wherein said electrode elements are tubular to permit introduction and removal of electrolyte therethrough.

9. The electrode assembly of claim 8 wherein said ion-pervious filter elements are relatively rigid porous plastic or ceramic members.

10. The electrode assembly of claim 8 wherein said ion-pervious filter elements provide substantial planar surfaces and are formed of a relatively rigid porous sheet material.

* * * * *